(12) United States Patent
Miller, Jr. et al.

(10) Patent No.: US 7,545,801 B2
(45) Date of Patent: Jun. 9, 2009

(54) IN-BAND CONTROL MECHANISM FOR SWITCHING ARCHITECTURE

(75) Inventors: Paul Miller, Jr., Derry, NH (US); Daniel W. English, Salem, NH (US); John Doucette, Londonderry, NH (US); Hicham Saab, Derry, NH (US)

(73) Assignee: Cedar Point Communications, Inc., Derry, NH (US)

( * ) Notice: Subject to any disclaimer, the term of this patent is extended or adjusted under 35 U.S.C. 154(b) by 1093 days.

(21) Appl. No.: 10/726,000

(22) Filed: Dec. 1, 2003

(65) Prior Publication Data

US 2005/0021593 A1    Jan. 27, 2005

Related U.S. Application Data

(60) Provisional application No. 60/430,494, filed on Dec. 2, 2002.

(51) Int. Cl.
*H04L 12/66* (2006.01)
*H04L 12/28* (2006.01)
(52) U.S. Cl. .............. 370/352; 370/401; 370/410
(58) Field of Classification Search .............. None
See application file for complete search history.

(56) References Cited

U.S. PATENT DOCUMENTS

| | | | |
|---|---|---|---|
| 5,781,537 A | 7/1998 | Ramaswami et al. | |
| 6,532,239 B1 | 3/2003 | Shim et al. | |
| 6,539,011 B1 * | 3/2003 | Keenan et al. | 370/352 |
| 6,598,106 B1 | 7/2003 | Grieshaber et al. | |
| 6,636,511 B1 * | 10/2003 | Roy et al. | 370/390 |
| 6,674,750 B1 * | 1/2004 | Castellano | 370/354 |
| 6,711,171 B1 | 3/2004 | Dobbins et al. | |
| 6,963,561 B1 * | 11/2005 | Lahat | 370/356 |
| 7,061,935 B1 * | 6/2006 | Roy et al. | 370/468 |
| 7,133,417 B1 * | 11/2006 | Kao et al. | 370/467 |
| 7,203,187 B1 * | 4/2007 | Richardson et al. | 370/352 |
| 2002/0001307 A1 * | 1/2002 | Nguyen et al. | 370/386 |
| 2002/0087370 A1 * | 7/2002 | Brueckheimer et al. | 705/7 |
| 2002/0089925 A1 * | 7/2002 | Smith et al. | 370/216 |
| 2003/0026250 A1 * | 2/2003 | Fang | 370/386 |
| 2004/0233902 A1 * | 11/2004 | Medhat | 370/375 |

\* cited by examiner

*Primary Examiner*—Andrew Lee
(74) *Attorney, Agent, or Firm*—Ropes & Gray LLP

(57) ABSTRACT

Systems for in-band control that establish relationships between incoming data and one or more destinations to which the data is to be transmitted. In the in-band control embodiments described herein, a connection is established between two ends of a circuit by provisioning at one end of the circuit. A circuit connection table is kept at both ends of the circuit. This table contains the new and existing circuit connection information. A software process writes to the connection table at the local end of the circuit with the address information of the remote end of the circuit. The circuit connection information is to be periodically sent to the remote end to establish or tear down new connections.

18 Claims, 7 Drawing Sheets

Ingress Flow

Egress Flow

IN-BAND CONTROL MECHANISM FOR SWITCHING ARCHITECTURE

REFERENCE TO RELATED APPLICATIONS

This application claims priority to Provisional application Ser. No. 60/430,494, filed on Dec. 2, 2002, and hereby incorporated herein by reference in its entirety.

BACKGROUND

Today, there is tremendous opportunity to change and improve the way individuals exchange data. Engineers and scientists are now developing technologies and devices that can be employed to allow cable subscribers to make telephone calls, transmit faxes and perform other telecommunication functions over the cable network. One technology just combines into one system two separate switches, one that switches TDM data and one that switches packets. Other architectures have been suggested. In any case, the basic job of the switch is to provide a system that brings together the time division multiplexing (TDM) telephony switching technology used by telephony circuits with the IP switching technology employed by the cable network. Thus, as networks merge, systems are being designed to accommodate both TDM circuit traffic and packet traffic simultaneously.

Whatever the architecture, or approach taken, the system will still need to support calls between two or more parties. It is generally understood that calls are supported by circuits that are (typically) bi-directional entities that require both ends of the calls to be set up to support the circuit. The act of setting up a call involves a step of provisioning resources at either end, both local and remote.

Provisioning may be out-of-band—such as SS7 signaling—which requires an additional communication channel, or in-band which requires some available bandwidth for the setup control messages. In-band mechanisms are often preferred because they eliminate the additional control channel, however as they compete for resources, many in-band control systems are inappropriate for switches that must meet the demands of moving TDM data over an IP network Accordingly, there is a need in the art for a control scheme that operates with communication systems that support call distribution over a mixed network.

Accordingly, there is a need in the art for a control scheme that operates with communication systems that support call distribution over a mixed network.

SUMMARY OF INVENTION

The systems and methods described herein include, among other things, systems and methods for in-band control signaling and for remote provisioning of circuits. As will be described in more detail hereinafter, the systems include in-band control mechanisms that establish relationships between incoming data and one or more destinations to which the data is to be transmitted. Typically, the relationship comprises a circuit or a data flow and the in-band control mechanism provides for call set up and tear down as calls and flows begin and end.

In one embodiment, the in-band control mechanism works with systems that pass TDM traffic through a packet switch. Such a system may include a packet switch that has a plurality of data ports and is capable of routing packets between the plurality of data ports. A TDM encapsulation circuit processes a TDM data flow that is incoming to the switch. A circuit demultiplexer processes the incoming data flow to buffer data associated with different TDM circuits into different buffer locations. The different buffer locations may be associated with different circuits or destinations. The in-band control mechanism described herein performs provisioning control at one end of the circuit, and this provisioning establishes the connections between two ends of the circuit. To this end, a software process writes to a connection table at the local end of the circuit with the address information of the remote end of the circuit. The address information identifies memory locations where data associated with a particular call may be stored. The circuit connection table can be transmitted in-band to the remote end and is kept at both ends of the circuit. The table contains the new and existing circuit connection information. The connection information is sent to the remote end(s) to establish or tear down new connections either periodically or as the table content changes.

Other objects and aspects of the invention will, in part, be obvious, and, in part, be shown from the following description of the systems and methods shown herein.

BRIEF DESCRIPTION OF THE DRAWINGS

The present disclosure may be better understood and its numerous features and advantages made apparent to those skilled in the art by referencing the accompanying drawings.

The use of the same reference symbols in different drawings indicates similar or identical items.

DESCRIPTION

To provide an overall understanding of the invention, certain illustrative embodiments will now be described. For example, in one embodiment the systems and methods described herein provide a media switching system that may couple to the headend of a cable system operator and exchange data between the headend and the PSTN. Provisioning control occurs in-band and calls are setup and torn down in response to the in-band control. The systems described herein allow cable system operators having two-way connectivity to offer, inter alia, voice services. As multiple calls and flows may be handled through a single switch, and as the number of calls and flows may change dynamically, the in-band control mechanisms facilitate efficient control over the calls and flows being handled through the system.

However, it will be understood by one of ordinary skill in the art that the systems and methods described herein can be adapted and modified for other applications and that such other additions and modifications will not depart from the scope hereof.

Figure 1:
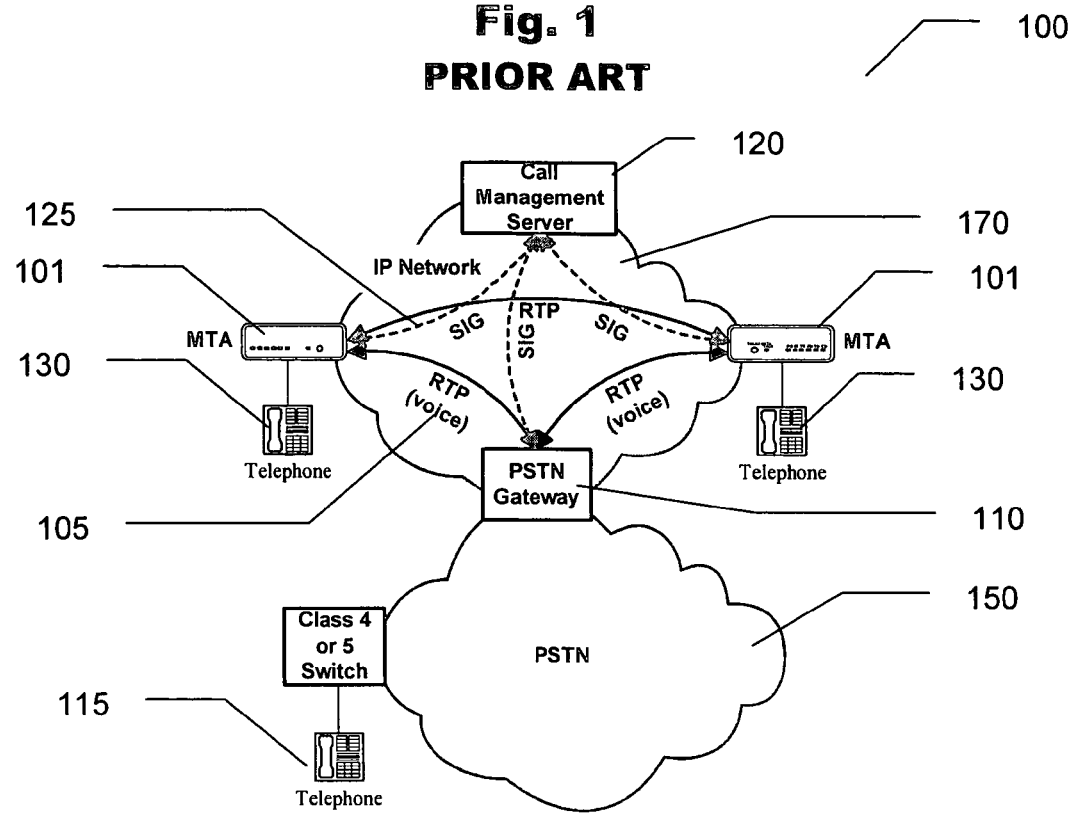
FIG. 1 is a high-level block diagram of a prior art VoIP softswitch architecture.

In prior art distributed telephony systems, such as the system 100 depicted in FIG. 1, a Call Management Server 120 responds to the media termination adapters (MTAs) 101 that will be involved in the call by providing to each MTA the other MTA's IP address. The depicted MTA 101 may be a PacketCable client device that contains a subscriber-side interface to the physical telephony equipment 130 (e.g., telephone), and a network-side signaling interface to call control elements in the network. An MTA typically provides the codecs, signaling and encapsulation functions required for media transport and call signaling. MTAs typically reside at the customer site and are connected to other network elements, such as for example via the Data Over Cable Service Interface Specification (DOCSIS) network. There are two common MTAs: standalone (S-MTA) and embedded (E-MTA), although any suitable MTA may be employed with the systems described herein. The IP network can thus route calls between MTAs based on traditional routing methods, path availability, cost, levels of congestion, number of hops, and others aspects of traffic and routing engineering. To this end, as shown in FIG. 1, the system 100 includes telephone systems 130 coupled to the MTAs 101. The MTAs exchange data across the IP Network 170, with signaling data 125 and voice data (RTP) 105 traveling across the network and between the Call Management Server (CMS) 120 and the PSTN gateway 110. The system 100 further depicts that coupled to the PSTN gateway is the PSTN network 150 with a class 4 or 5 switch for establishing circuit connections to the depicted telephony equipment 1115.

In operation, a customer using the telephone 130 can use the MTA 101 to connect to the IP network 170 where the CMS 120 can support the delivery of a call across the PSTN gateway and onto the PSTN 150. Typically, the CMS provides call control and signaling-related services for the MTA, and PSTN gateways.

The approach provided by system 100, although effective for data communications, proves to be non-causal and non-deterministic for time-sensitive services like voice, where path latency, quality, privacy, and security need to be tightly controlled.

By contrast, the systems and methods described herein, provide paths that are deterministic, allowing for controlling the latency and the quality of the path to the switch. To this end, the systems and methods described herein provide, among other things, a single, highly integrated, secure, and reliable delivery point for multimedia services/data in a single network element with a single management system. By reducing the number of elements in the network, links are reduced, points of failure are reduced, and overall network reliability is increased. In addition, the level of integration provided by the described architecture allows for the efficient implementation of high-availability, fault-resilient methods of call-control, path restoration, and service delivery.

Figure 2:
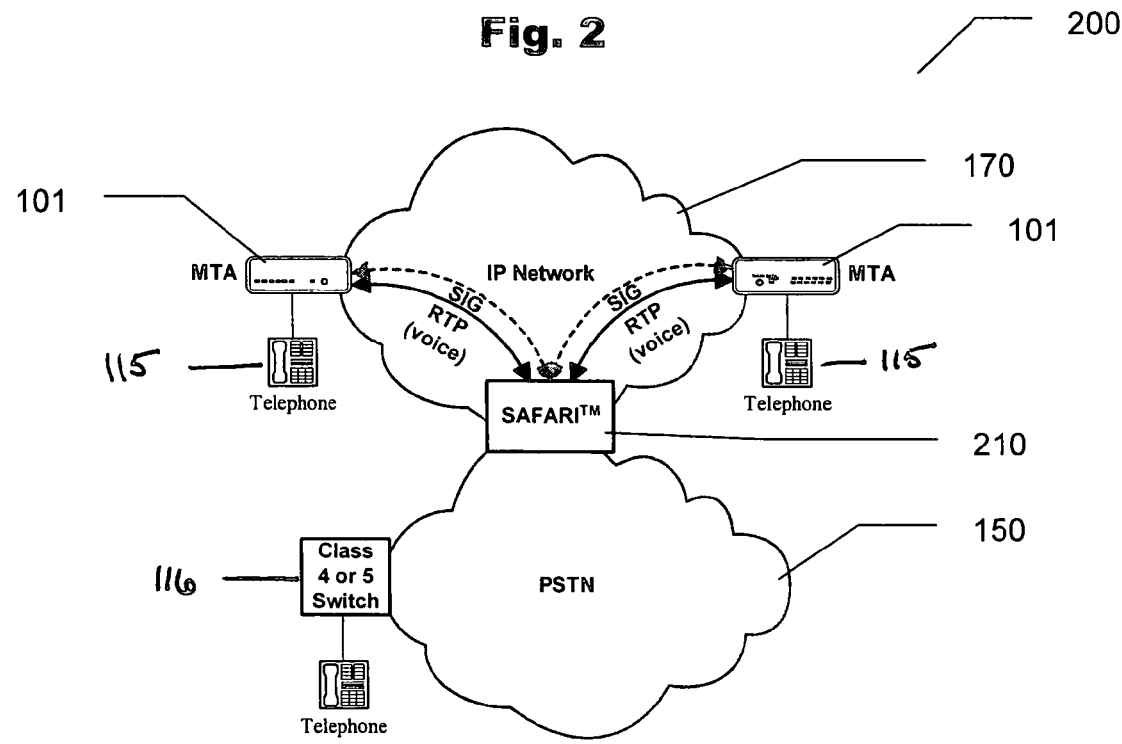
FIG. 2 is a high-level block diagram of the VoIP architecture according to one embodiment of the invention.

FIG. 2 illustrates one exemplary embodiment of a system 200 according to the invention. As shown in FIG. 2, the system 200 may comprise a plurality of MTAs 101, and a packet switch 210. The MTAs 10 and the packet switch 210 exchange information between themselves across the network 170. System 200 also includes a circuit switch, depicted as a class 4 or 5 switch 116 that allows circuits to be established across the PSTN 150 to support calls made with the one or more telephones 115. In one application the system 200 is situated at the headend of a cable system. The system 200 may interface with the cable modem termination system (CMTS) in a packet-based architecture, and/or replace a Class 5 switch as the device between the public switching telephone network and the host digital terminal in a circuit environment, thereby offering a migration path from circuit switched telephony to packet switched telephony. The system 200 may, in certain embodiments, enable packet-to-packet, packet-to-circuit, circuit-to-packet and circuit-to-circuit calls over the same packet based switch fabric.

Accordingly, the system 200 depicts a system for supporting communication across an IP network and the PSTN. However, this architecture was chosen merely for the purpose of clarity in illustration and the systems and methods described herein are not so limited. For example, although FIG. 2 depicts the PSTN network 150, the systems and methods described herein may be employed to support architectures that incorporate other types of switching networks. Thus, the systems and methods may be employed with any circuit-switched network that provides a network in which a physical path is obtained for and typically dedicated, or substantially dedicated, to a single connection between two or more end-points in the network for the duration of the connection. Moreover, although FIG. 2 depicts an IP network 170, the systems and methods described herein are not so limited and may be employed with other packet-switched networks. Thus, the system 200 may be employed with other types of packet networks in which small units of data (packets) are routed through a network based on the destination address contained within a packet. This type of communication is typically described as connectionless, rather than dedicated like the circuit-switched network.

Figure 3:
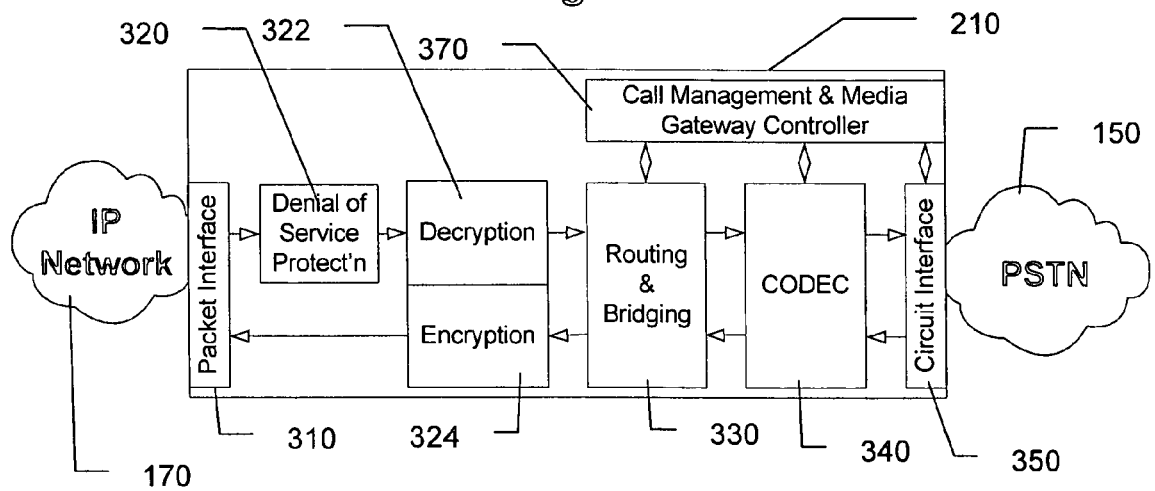
FIG. 3 is a functional block diagram according to one embodiment of the invention.

The switch 210 includes interfaces to the IP 170 and PSTN Networks 150, optional Denial of Service (DoS) attack protection, optional encryption and decryption unit, routing and bridging, and TDM Coding/Decoding (CODEC) functions, as shown in FIG. 3.

RTP data units, conventionally referred to as "packets," originating from any MTA 101 in the IP network 170 are first received at an ingress port (not shown), processed by the Packet Interface 310, and sent, in one embodiment, to the Denial of Service Protection block 320. The DoS protection block 320 keeps Denial of Service attacks from reaching and degrading subsequent packet processing. Packets are then decrypted to meet the security requirements of the IP network 170 and sent to the Routing & Bridging block 330.

Note that the "processing" referred to above includes reformatting the RTP data unit streams into encapsulated packet streams for use internal to the switch 210. These encapsulated packets (discussed further below) provide for efficient transport and receipt at the egress ports.

The Routing & Bridging block 330 applies the appropriate routing and/or bridging function based on the destination and services specified for the call to determine which egress port to send the data units out on. Packets can be rerouted (directed) back to the IP network 170, in which case they will be encrypted 324 and processed by the Packet Interface 310, or sent to the CODEC block 340.

The CODEC block performs standard coding and decoding functions such as those described in ITU Specifications G.711, G.729, G.168, and/or N-way bridging.

The depicted Circuit Interface 350 provides a standard DS0 circuit interface to the PSTN; likewise, the Call Management and Media Gateway Controller 370 performs typical functions defined for VoIP telephony and currently practiced in the art. Arranging these functions as illustrated protects IP network users and services from malicious attack and provides a unique solution for providing carrier grade telephony and CALEA monitoring services in a VoIP network.

In one embodiment, internal communications and switching functions within the switch are implemented using direct fiber optic connections through a fiber optic backplane equipped with removable optical backplane connectors. One removable backplane connector is further described in U.S.

patent application Ser. No. 09/938,228, filed on Aug. 23, 2001, incorporated herein by reference in its entirety.

The depicted system 200 utilizes a low-latency, low-overhead, bandwidth-efficient method for DS0 circuit encapsulation designed to carry circuit traffic as efficiently as packet traffic. This DS0 circuit encapsulation method may be configured to accommodate mix of data units, packets, and VoIP traffic. In particular, it provides a method for encapsulating circuit traffic for low-overhead packet data unit switching through a fabric so that the specific delay requirements of voice and other latency-intolerant circuit traffic are met. Although the system 200 is described with reference to DS0 traffic, it is not so limited and may be applied to other types and formats of traffic traveling across the circuit-switched network. In such applications, the information being transmitted across or otherwise associated with a circuit will be identified and encapsulated for transmission through the switch 210.

Figure 4A:
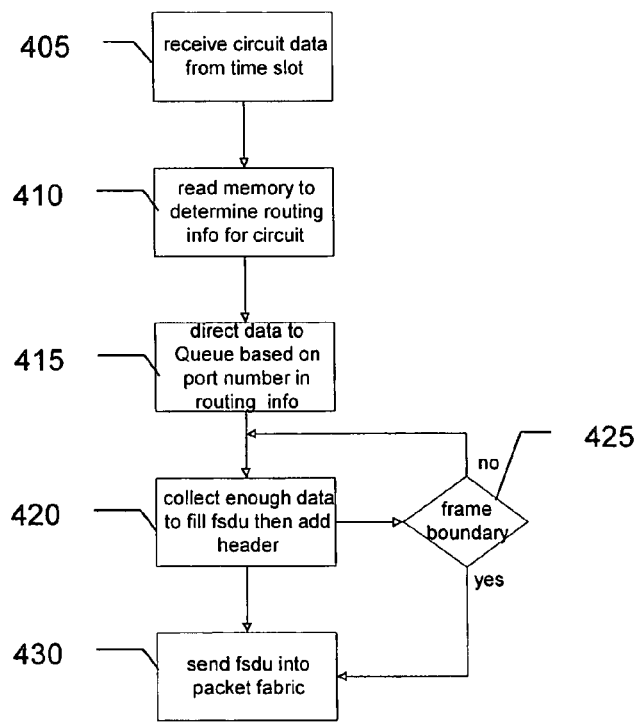
FIGS. 4A-C are flowchart depictions of packet handling processes employed by the invention.

One exemplary encapsulation process is illustrated in FIG. 4A. Here, the Ingress flow (whose processing is shown in FIG. 4A) is a data stream coming into the switch from the circuit network, i.e., the PSTN. The Egress flow (shown in FIG. 4A) is the data stream leaving the switch and entering the PSTN in a TDM time slot.

For an ingress flow, shown in FIG. 4A, processing begins when the circuit data unit is received (read) during the selected TDM time slot, step 405. The process then checks memory to determine the routing information corresponding to the received data unit, step 410. The data unit is directed to a particular queue based on the egress port number derived, at least in part, from the routing information, step 415. In one embodiment, the memory stores a connection table. In a circuit-switch system a connection may be established between two ends of a circuit by provisioning one end of the circuit. The connection may be within the same system or between physically separate systems. In either case, the system is to have a transmission media with available bandwidth to send control cells that are carried in-band and that contain the information that the remote end of the circuit employs to provision that circuit. The systems and methods described herein may be employed for switching/routing control information as well as data being communicated by the parties.

In one embodiment, a circuit connection table is kept at both ends of the circuit. This table contains the new and existing circuit connection information. The circuit that is to be established may be constant bit rate (CBR) or variable bit rate (VBR). A software process writes to the connection table at the local end of the circuit with the address information of the remote end of the circuit. The circuit connection information may be periodically sent to the remote end(s) to establish or tear down new connections. The frequency of these updates may be determined by the requirement of the application and the amount of bandwidth that one is willing to forfeit. In applications where a live person is waiting for the connection to be established, an update frequency of 5-50 times a second is sufficiently fast. Because this mechanism may be embedded in hardware such as filed programmable gate arrays, it can be very fast and introduces little overhead on the system processor. In either case, the connection table stores information that may be employed by the switch 210 for maintaining routing information for the circuits being handled.

In one embodiment, the incoming TDM data is sorted and data associated with one circuit is stored in one of a plurality of FIFOs and data associated with a second separate destination is stored in a different respective FIFO. In this way, each FIFO acts as a memory buffer that stores incoming data for a particular destination. This process is graphically depicted in FIG. 4C which shows the incoming TDM data being sorted and stored into separate storage devices based on the destination associated with each incoming packet of TDM data. To this end, the switch may include a circuit demultiplexer that processes the incoming data flow to buffer data associated with different TDM circuits into different buffer locations. Once the incoming TDM data is sorted into separate storage devices, the system may read data from the storage devices in a predictable and controlled manner. On the other end, the switch may include a circuit demultiplexer that has a table access process for accessing the connection table and for providing data to one or more of the TDM circuits at the output port.

Step 420 continues the process of steps 405 through 415 until enough data units are collected to fill a generated full size data unit (FSDU) by testing for a frame boundary, 425, after each addition to the queue. Once the FSDU is filled, a header is added to the FSDU, creating the encapsulated packet. The encapsulated data packet is then sent into the switch fabric and directed to the proper egress queue, in step 430. The process repeats at step 405 as long as there is data present at the ingress port.

Figure 4B:
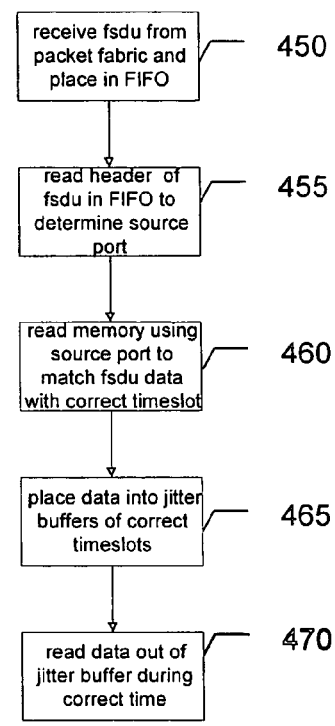

The egress flow process, depicted in one embodiment, in FIG. 4B, is similar. In step 450, the encapsulated data packet is received from the switching fabric and placed in a FIFO buffer. The header is read, step 455, and the source port is determined from the information stored in the header. The source port identifier is used to read the memory location corresponding to this FSDU to determine the correct timeslot for each data unit in the FSDU in step 460. The data units in the FSDU are then unpacked (i.e., re-formatted) and placed into jitter buffers corresponding to the destination timeslot for each data unit, step 465.

When the correct timeslot time arrives, the data units are read out of each jitter buffer and transmitted into the TDM stream.

The switching system processes described above with reference to FIGS. 4A and 4B may be realized as a one or more software processes operating on data processing platform. In that embodiment, the processes may be implemented as a C language computer program, or a computer program written in any high level language including C++, Fortran, Java or BASIC. Additionally, in applications where the processes is code running on an embedded system, the computer programs may be written, in part or in whole, in microcode or written in a high level language and compiled down to microcode that can be executed on the platform employed. The development of programs is known to those of skill in the art, and such techniques are set forth in, for example, Stephen G. Kochan, Programming in C, Hayden Publishing (1983).

The depicted exemplary embodiment is used to switch both packet traffic and TDM-based DS0 traffic simultaneously using the same fabric. A packet switch (by definition) is designed to handle the specific requirements of packet traffic, and the system 200 may provide conventional packet switching functionality as described elsewhere in this disclosure.

Figure 4C:
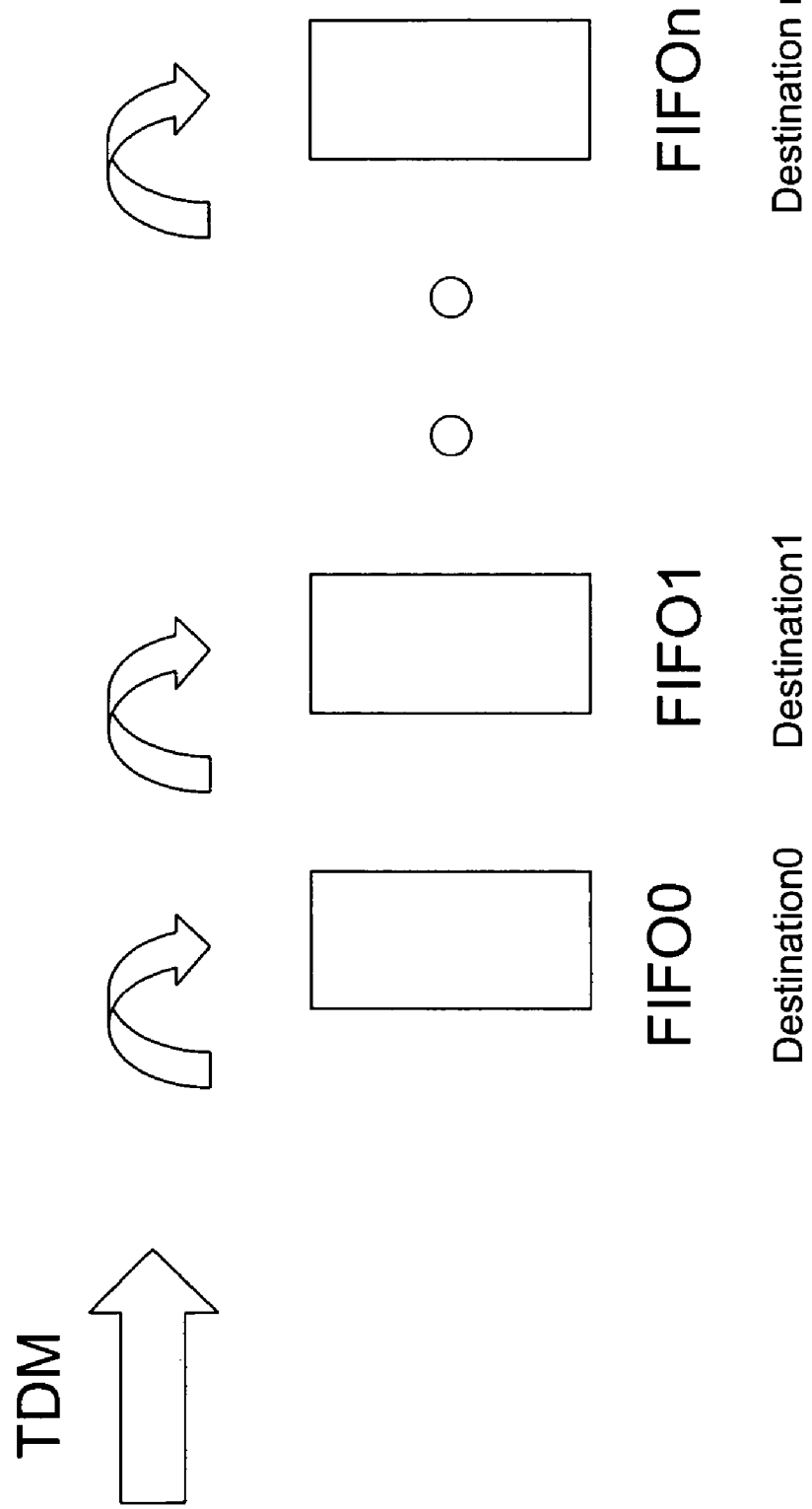
Figure 5:
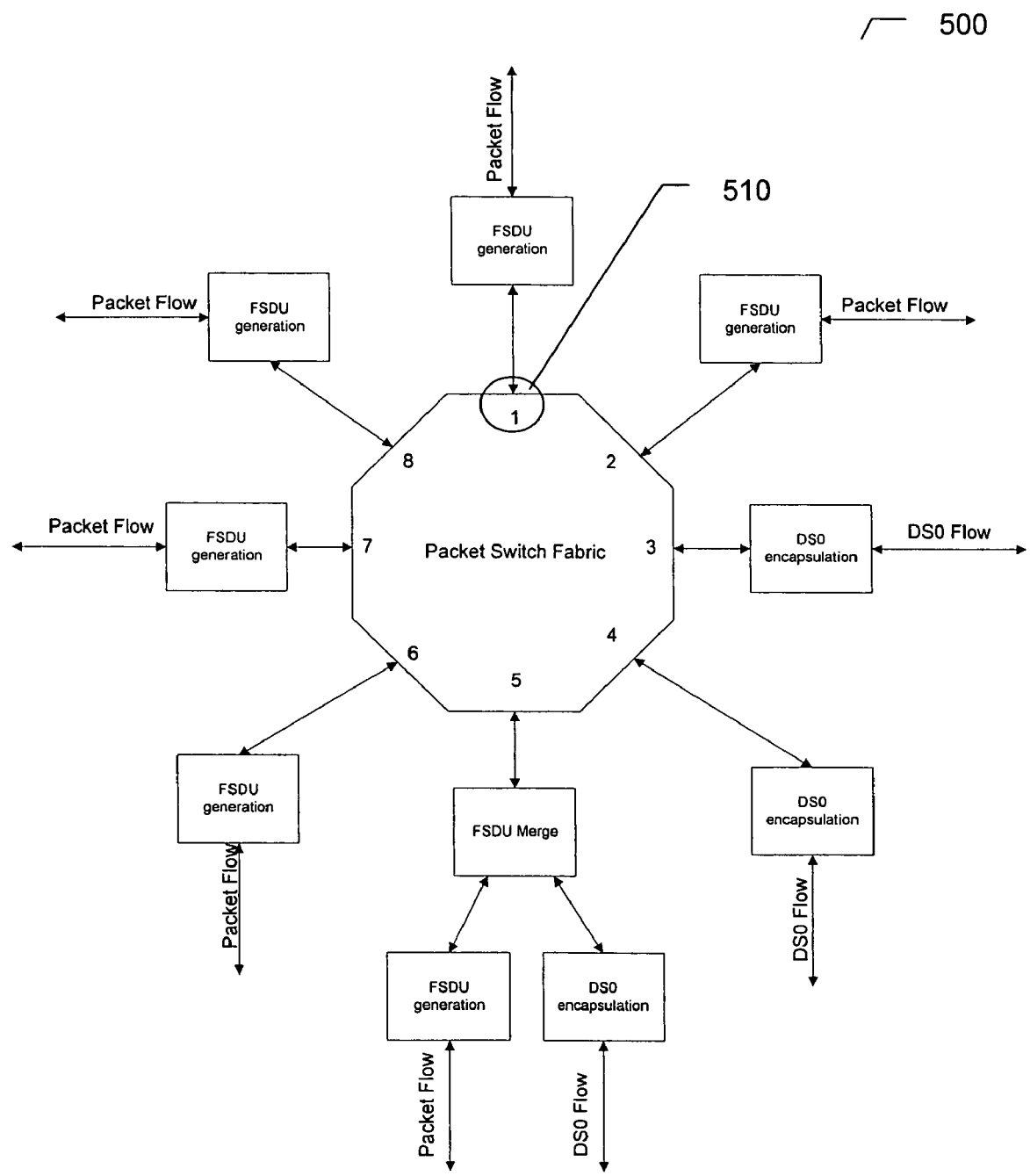
FIG. 5 is a high-level block diagram of a switch fabric architecture of an exemplary embodiment of the invention.

Turning to FIG. 5, one embodiment of a system 500 according to the invention is depicted. Specifically, FIG. 5 illustrates a packet switch fabric 500 capable of passing TDM traffic. As show, the packet switch fabric 500 has a plurality of data ports, 1, 2, . . . 8. The switch is capable of routing FSDU packets between these data ports. As described in more detail below, in the depicted embodiment, several of the ingress ports, 3, 4, and 5, are managing both incoming and outgoing flows of TDM data. Port 5 is capable of supporting a combination of traffic types. The switch 500 includes several TDM encapsulation circuits 512 that process a respective TDM data flow. The circuit demultiplexer processes the incoming data flow to buffer data associated with different TDM circuits into different buffer locations, as shown in FIG. 4C. An internal timer process monitors the amount of time available to fill the FSDU, and when the time period reaches the frame boundary, the depicted FSDU generators 514 create an FSDU that is filled with data associated with the TDM circuits. The FSDU generators 514 create header information that is added for allowing the packet switch 500 to route the generated FSDU to a port associated with the respective TDM circuit.

FIG. 5 further depicts that certain ports handle both type of traffic. A FSDU merge circuit 518 communicates with the FSDU generators 514 and the encapsulation circuits 512 to merge the generated packet flow for delivery to and from port 5.

As the ports 1,2, . . . 8 are depicted as bi-directional, the switch 500 may include a decapsulation circuit for processing a generated FSDU that has been passed through the packet switch. The decapsulation circuit provides data to one or more TDM circuits that are sending data from a port 1,2, . . . 8 of the packet switch 500.

A packet switch fabric 500 has a finite number of high-speed ports 510 (eight, for example), as shown in FIG. 5, although any number can be used in practice. This implies that there may be eight ingress (input) ports and eight egress (output) ports to the switch fabric. In each cycle time, the eight inputs may be connected in some fashion to the eight outputs to create up to eight connections. During this cycle time, one FSDU may be passed on each connection. Depending on traffic behavior, not every input may be able to connect to the output required for the FSDU it has to send (i.e., contention may arise). In this situation, it may take several cycle times for all eight inputs to send one FSDU. If all inputs wish to send their FSDU to the same output, it will take eight cycle times for all the FSDUs to be sent.

Switch traffic may consist of any arbitrary mix of packet traffic and DS0 traffic on the different ports. Some ports may be dedicated to packet traffic (e.g., port 511 in FIG. 5), some ports may be dedicated to DS0 traffic (e.g., port 513), and some ports may support a combination of traffic types (e.g., port 515). The depicted switch 500 allows for any combination of traffic types without affecting the performance characteristics required by the applications. Furthermore, the switch 500 is transparent to the actual information represented by the packet or TDM (DS0) data flows. Voice signals, data, FAX or modem signals, video, graphics, or any other information can be carried and switched with equal ease and facility by and within the systems described herein.

Typically, a DS0 TDM circuit carries a single byte of data every 125 usec. This time interval is more commonly referred to as a frame in the telecommunications arts. Since the packet fabric has an FSDU of between 64 bytes and 256 bytes, a single DS0 TDM circuit does not come close to filling an FSDU. The remaining space in the FSDU would be wasted by filling it with padding if an individual DS0 circuit was dedicated to a single FSDU. Thus, it would be very inefficient to map a single byte of data into such a large FSDU.

One option is to wait a longer period of time in order to accumulate a larger number of bytes for the DS0 circuit. In order to fill a 64 byte FSDU, one would have to wait 8 msec, or 32 msec for a 256 byte FSDU. With voice calls, this represents a significant delay for the circuit and does not meet typical "toll" Quality of Service network switching requirements. It also requires a much larger amount of memory to handle the temporary storage of this data. Neither one of these options is ideal.

Figure 6:
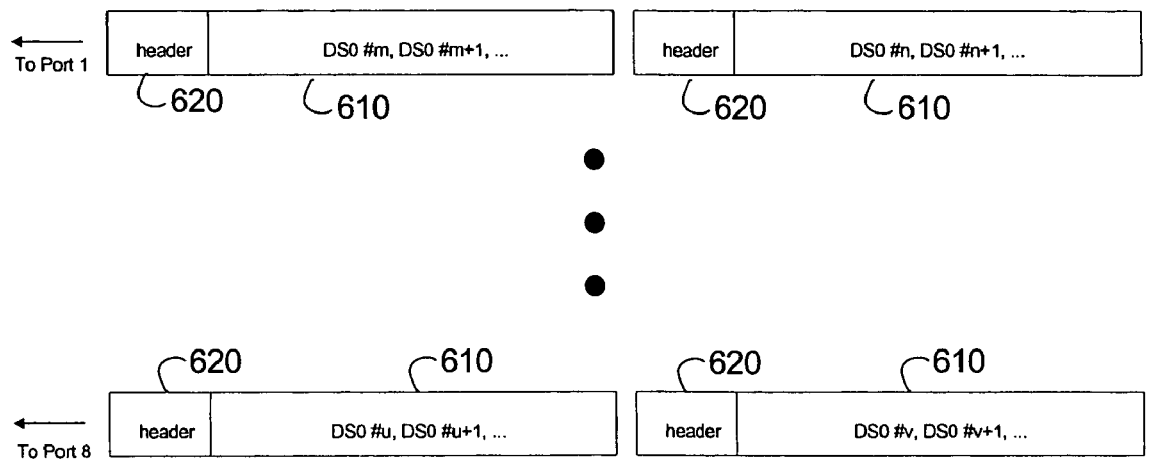
FIG. 6 is a schematic representation of the TDM data format employed in some embodiments of the invention.

According to some embodiments, multiple DS0 TDM circuits are combined within each frame time to more completely fill an FSDU 610. This combination is illustrated in FIG. 6. Since there is a fixed and manageable number of switch fabric ports, it is reasonable to fill FSDUs 610 with multiple DS0 circuits destined for the same switch fabric output port.

This a dynamic process: as DS0 circuits destined for a particular switch fabric come and go, the process dynamically adds and drops DS0 circuits to efficiently fill the FSDU 610 destined for each port. To this end, the packet switch 500 may include a dropped-circuit detector that determines if a circuit is dropped. In one embodiment, the dropped circuit detector is a table that monitors the number of circuits in the data flow of TDM data. If a circuit is dropped, all circuits that are still active will slide to fill in the hole left by the dropped circuit. The dropped circuit detector may be a hardware device, a software process or any combination thereof.

For each of the switch fabric ports receiving packet flow data, a separate circuit 520 (referring to FIG. 5) is used to generate FSDUs for traffic headed for that port. A header 620 at the beginning of each FSDU identifies the switch fabric port along with priority information to guide the FSDU properly through the switch fabric. The rest of the FSDU is filled with TDM data. For example, if a 64 byte FSDU contains 2 bytes of overhead, the remainder of the FSDU can be filled with 62 DS0 TDM channels. Within each frame, as a single byte of data from each circuit is received on the device, it is added to the FSDU for the particular destination port to which it should be sent. When an FSDU is full, it is sent to the packet switch and another FSDU is started for that port. In typical embodiments, all FSDUs are sent by the end of the frame, even if they are not completely filled, in order to keep the delay of the method to 125 usec. Using this scheme, the data is filled in the FSDUs with 62/64 or 96.9% efficiency per FSDU except for at most 16 FSDUs that may be only partially filled. With a 256 byte FSDU, this efficiency rises to 254/256 or 99.2% per FSDU. If the switch can handle 16,000 circuits, the 64 byte FSDU has an overall efficiency of 91.2% and the 256 byte FSDU has an overall efficiency of 93.4%. In comparison, putting a single DS0 TDM channel into an FSDU has an efficiency of only 1.6%.

On the output (egress) side of the switch fabric, the FSDUs are processed (reformatted) to remove the headers and pull out the individual DS0 channels. The routing information for each channel can be made available to the processing device at the output of the switch fabric through different methods that are well-known in the switching and routing arts. The DS0s are then put back into a TDM format again for transmission through the egress ports and into the network.

In conjunction with the method for packing the FSDUs as described above, since the DS0 data is very time sensitive, it must be passed through the switch fabric with a guaranteed maximum latency. As mentioned above, the switch fabric is shared with packet traffic that can exhibit bursty arrival behavior. To prevent packet traffic from competing with the high priority TDM traffic, the TDM-based FSDUs are assigned a priority level that is higher than that of the packet traffic. Provided the bandwidth allocated for the particular priority level assigned to TDM traffic is not exceeded, the amount of TDM traffic is deterministic, and the latency for TDM traffic through the switch fabric can be guaranteed independent of the quantity of packet traffic. To this end, the switch 500 may include a priority circuit for associating a routing priority level with a generated FSDU. In one embodiment, the circuit adds priority data to the header information of the respective FSDUs. Additionally, the switch 500 may include a bandwidth allocation process for allocating bandwidth for the generated FSDU traffic. The bandwidth allocation process may be a software process that provides a predetermined latency period for routing traffic through the packet switch.

The effect of this method is such that the circuit and packet traffic can be mixed in any combination through the switch fabric with neither type of traffic impacting the performance of the other.

Since the latency can be bounded, it is now possible to reconstruct the TDM stream on the output side of the switch fabric and align the individual data streams into the correct time slot assignment. In order to accomplish this, a jitter buffer is necessary to smooth out the variable delays encountered by going through the packet switch. Since low latency is important, it is necessary to size the jitter buffer as small as possible; however, the jitter buffer must be sized large enough to account for the minimum and maximum latencies through the switching fabric. Using commercially available packet switch fabrics, it is reasonable to constrain the jitter buffer to introduce an additional delay of no more than a single frame time of 125 microseconds.

This system architecture's switch fabric implementation thus produces a single switch fabric with the latency and throughput performance equivalent to having separate dedicated TDM and packet switches. It accomplishes this without the expense of multiple fabrics or the complexity of interconnecting them.

Although the systems and methods described have been directed to systems that exchange information, whether voice, data, fax, video, audio or multi-media, over the PSTN network 150, the systems and methods described herein are not so limited. The systems and methods describe herein may be employed to support architectures that incorporate other types of switching networks. Thus, the systems and methods may be employed with other circuit-switched networks that provide a network in which a physical path is obtained for and typically dedicated, or substantially dedicated, to a single connection between two or more end-points in the network for the duration of the connection. Moreover, although FIG. 2 depicts an IP network 170, the systems and methods described herein are not so limited and may be employed with other packet-switched networks. Thus, the system 200 may be employed with other types of packet networks in which small units of data (packets) are routed through a network based on the destination address contained within a packet. This type of communication is typically described as connectionless, rather than dedicated like the circuit-switched network.

In-Band Control Mechanism

Circuits are typically bi-directional entities that require a simultaneous coordination of both ends of the circuit to establish the circuit. Provisioning mechanisms may be out-of-band which requires an additional communication channel, or in-band which requires some available bandwidth for the setup control messages. In-band mechanisms are often preferred because they eliminate the need for this additional control channel. In either case, it usually results in an asynchronous setup whereby one end of the circuit is initiated prior to the other, resulting in delays before the circuit can be used. In addition, an in-band provisioning mechanism allows the connection state to be refreshed periodically to prevent the termination of a connection in the case where connection state information is lost. A valuable benefit achieved by this refresh capability is to provide an efficient failover mechanism when the hardware retaining the circuit state information must be failed over to another piece of hardware.

The in-band control mechanism described here applies very little overhead to the communication channel and can easily be implemented in a programmable logic device. This mechanism applies seamlessly to a 1:1 or 1:N protection scheme.

In the in-band control embodiments described herein, a connection is established between two ends of a circuit by provisioning at one end of the circuit. The connection may be within the same system or between physically separate systems. In either case, the system is to have a transmission media with available bandwidth to send control cells that are carried in-band and that contain the information that the remote end of the circuit employs to provision that circuit. In one embodiment, a circuit connection table is kept at both ends of the circuit. This table contains the new and existing circuit connection information. The circuit that is to be established can be constant bit rate (CBR) or variable bit rate (VBR). A software process writes to the connection table at the local end of the circuit with the address information of the remote end of the circuit. The circuit connection information is to be periodically sent to the remote end(s) to establish or tear down new connections. The frequency of these updates may be determined by the requirement of the application and the amount of bandwidth that one is willing to forfeit. In applications where a live person is waiting for the connection to be established, an update frequency of 5-50 times a second is sufficiently fast. At the times designated by the update frequency, the connection information from the connection table is read by hardware, formed into control cells, routing headers are attached, and the control cells are sent to the remote end(s). Because this mechanism may be embedded in hardware, it can be very fast and introduces little to no overhead on the system processor.

The control cells are received by the remote end(s), parsed, and entered into the connection memory table at the device on that end. In one practice, the control cells are structured as a concatenation of destination addresses. Explicit source address information is not necessary, as the order in which data arrives at the remote end is representative of the source address for that data. Thus, this scheme employs the ordering of the addresses in the control cell to be representative of the source address for that data. The order is recorded in the connection table at the remote end. This control structure allows one to use a very efficient data cell structure. The data in the data cells can be sent without address information, as the ordering of the data matches the ordering of the addresses in the control cells An acknowledgement cell is returned from destination to source to validate the receipt of these control cells. Once the source receives the acknowledgement, it is free to start sending data for the new connections. In one embodiment, a simple mechanism is utilized to identify to the destination that the source has started sending the updated table. A single bit is used in the data header to identify that a "table swap" has occurred. Because of this, the data for the new connections can be sent at any time without the concern of synchronizing the far-end. Thus the latency of the connection is irrelevant for the setup and the scheme can be used without concern about latency.

Since the control cell information is only sent periodically, it introduces only a small bandwidth penalty on the transmission channel. For example, voice calls are sent at a frequency of 8000 times per second. If the control information is sent at a rate of 5 to 50 times a second, the control cells are 160 to 1600 times less frequent than the data cells.

With this control cell structure, there is also considerable flexibility in the number of circuits that can be controlled. Control and data cells can be made arbitrarily long and not affect the protocol.

Each time connection changes need to be made, or on a periodic basis regardless of changes, the entire connection map or portions thereof, may be sent to the remote/destination end. This provides advantages in the area of protection switching. In the case of a far-end equipment failure, where an equipment switch occurs but the connection information is lost, the control cells will arrive again and refresh the connection memory. In the case of a network protection switching event, the near-end can reroute the entire set of connections quickly as the systems may be fully implemented in hardware and is very bandwidth efficient.

Figure 7:
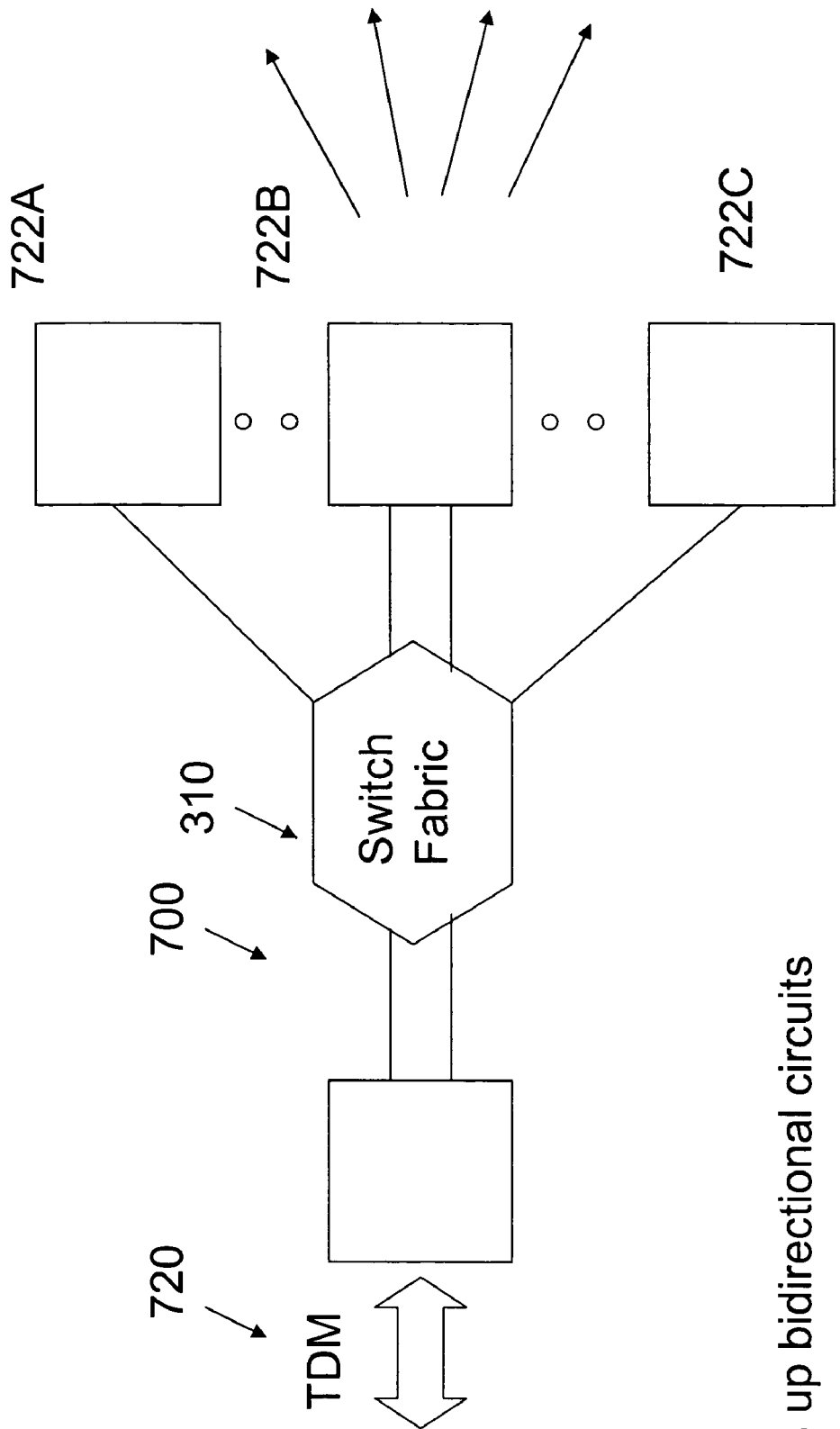
FIG. 7 depicts a functional block representation of a system according to the invention employing in-band control.

FIG. 7 depicts one embodiment of the system according to the invention for providing an efficient in-band control mechanism for remote provisioning of circuits. Specifically, FIG. 7 depicts a system 700 that includes a switch fabric 710 that couples between a local end or aggregation point 720 and a plurality of remote ends 722A, 722B and 722C. As shown in FIG. 7, the local aggregation point 720 can be a point at which the system 700 couples to an incoming trunk or trunks that may comprise a plurality of Ti lines delivering TDM data. As is known to those of skill in the art, Ti is a standardized TDM technology. Ti belongs to the physical layer in the OSI reference model, and Ti lines mostly connect between PABX's and CO's. The T1 standard is mostly deployed in USA, with E1 and J1 being other standards deployed in other areas. However, the systems and methods described herein do not depend on any particular standard or data format.

As shown in FIG. 7 the TDM data is received at this local aggregation point and will be processed by the switch 710 to move data across a plurality of circuits being supported by that switch 710. To set up the circuits, the system 700 employs the above described in-band control mechanism that performs remote provisioning for bidirectional circuits, although these systems can also be used with unidirectional circuits or multi-cast or broadcast channels. As will be described more fully below with reference to FIGS. 4C and 8 and with reference to Table 2, the system 700 sets up flows or connectors between calls. To this end, circuits are set up between local and remote points in the call. The system 700 uses in-band delivery of control cells which have information that can be employed at the remote end for setting up the remote end of a circuit or a plurality of circuits.

In one practice, the system 700 sorts the incoming TDM data into a plurality of separate storage devices and each storage device may be associated with a particular destination where a destination can represent a multiplicity of circuits. For example, the incoming TDM data may have information associated with four different calls to be made on four separate circuits. At the local end of the call the system can sort the incoming data based on the destination associated with that data and can store the data associated with one particular destination in a separate respective storage device. The local end of the circuit has a plurality of FIFO storage devices. In operation the incoming TDM data is sorted and data associated with one circuit is stored in one of the respective FIFOs and data associated with a second separate destination is stored in a different FIFO. In this way, each FIFO act as a memory buffer that stores incoming data for a particular destination. This process is graphically depicted in FIG. 4C which shows the incoming TDM data being sorted and stored into separate storage devices based on the destination associated with each incoming packet of TDM data. Once the incoming TDM data is sorted into separate storage devices, the system can read data from the storage devices in a predictable sequence. Accordingly, in the systems and methods described herein, information is read from the storage devices of FIG. 4C according to an established sequence. Thus, the sequence of data packets transmitted from the local end is selected to indicate with which circuit the data packet is associated. In the depicted embodiment, the system provides separate memory devices, however in other embodiments, fewer memory devices may be provided and a software-based system can maintain separate locations for each of the circuits. In this way a series of FIFO memory devices may be simulated and used with the systems and methods described herein.

Table 2 depicts one example of a connection table that may be established at the local end to store information that is representative of the relationship between the sequence of data being transmitted from the local end and the circuit to which each data packet in that sequence is associated. As shown in Table 2, the connection table may include a circuit ID, such as for example, CKT0, as well as a memory address or range of memory addresses, that represent where information associated with that respective circuit should be stored at the remote end. Information from the connection table may be encoded into control cells that may be transmitted in-band with the data being delivered from the local end to the remote end.

TABLE 2

Connection Table

| | |
|---|---|
| CKT0 | Memory Add |
| CKT1 | Memory Add |
| . | . |
| . | . |
| . | . |
| CKTN | Memory Add |

Figure 8:
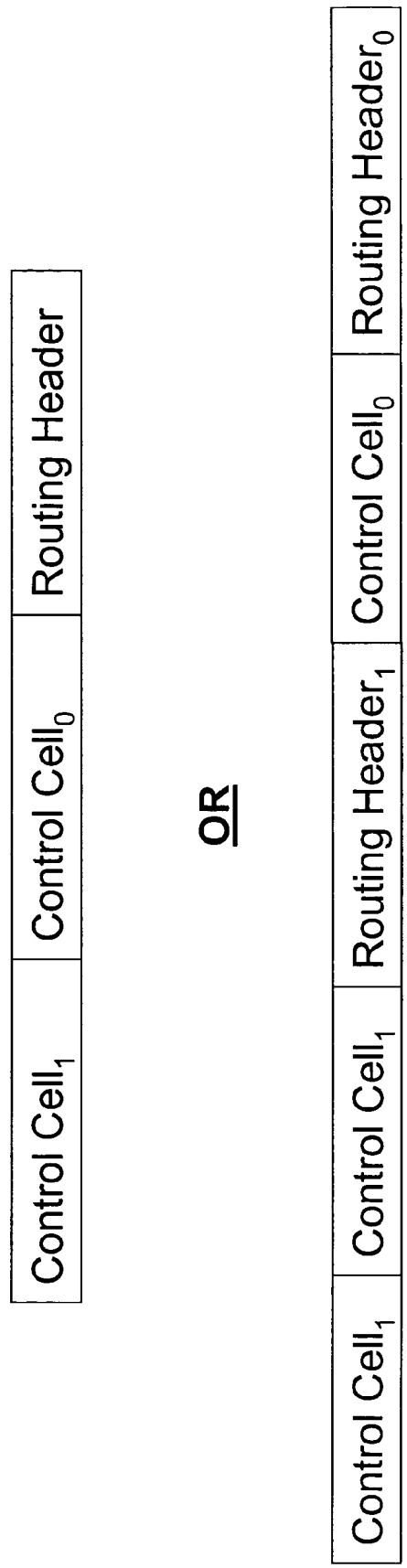
FIG. 8 provides a graphical representation of two examples of data being encoded into control cells.

FIG. 8 presents two examples of how data may be encoded into control cells. FIG. 8 depicts a first example wherein a routing header is attached to a plurality of control cells. Each control cell includes information that represents the relationship between the sequence of data packets being transmitted from the local end and the circuits to which the respective data packets are associated. Additional information within the control cell can include the memory addresses that are to be set aside at the remote end for storing the data being transmitted across a respective one of the circuits. In one embodiment, the remote end includes an addressable memory device that can store information within a specified address or within a specified range of addresses. Data packets associated with a particular source may be stored within an established address range. At the remote end the control cell information may be received and stored within a control cell memory location. Once this control data is stored in the control cell memory location the remote end can begin receiving data packets and can sort the data packets into particular addresses within a memory device based upon the order in which the data packets arrives at the remote end. As circuits are added or removed, new control cell data may be sent that will replace the existing control cell information stored at the connection table at the remote end. Additionally, as these circuits may be bidirectional, both the remote and local end may set up connection tables that are identical thereby allowing for bidirectional transfer of data across the circuits.

FIG. 8 also depicts an alternate embodiment wherein each control cell is associated with a separate routing header. In this embodiment a plurality of routing headers may be associated with the control cell information so that the control cell information may be distributed across a plurality of remote ends. In this way switching can occur not just in a 1:1 manner but also in a 1:N manner.

The in-band control mechanism has been described above with reference to call set up and tear down. However, this mechanism may be employed to support other control functions including call management, and tear down, wireless services such as personal communications services (PCS), wireless roaming, and mobile subscriber authentication, local number portability (LNP), toll-free and toll wireline services, enhanced call features such as call forwarding, calling party name/number display, and three-way calling.

Thus, the systems described herein may be employed to support VoIP (Internet Protocol), a connectionless protocol that typically is understood to allow traffic (packets) to be routed along paths with the least congestion. Additionally and alternatively, the systems and methods described herein may be employed to support VoDSL (Digital Subscriber Line). As is generally known, DSL is employed by phone companies to provide data and communications services on their existing infrastructure. VoDSL can be delivered over ATM, frame relay or IP. In such applications, the systems will typically include DSL modems (or Integrated Access Devices—IAD) in the consumer's home to interface between the DSL network service and the customer's voice/data equipment, and a voice gateway, which receives the voice traffic from the data network, depacketizes it and sends it to a Class-5 switch on the PSTN 150. The switch provides dial tone, call routing and other services for the circuit-switched network. In a further alternate embodiment, the systems and methods described herein may be used in VoFR (Frame Relay) applications. Such technology is used in corporate networks. Thus, in these applications, the systems and methods described herein may be employed for exchanging data across an LAN. Further, other applications include VoATM (Asynchronous Transfer Mode). As is generally known in the art, ATM is a high-speed scalable technology that supports voice, data and video simultaneously. It uses short, fixed-length packets called cells for transport. Information is divided within the cells, transported and then re-assembled at their destination. ATM allows providers to guarantee QoS. Many carriers use ATM in the core of their networks. It is also chosen by large corporations to connect locations over a WAN. ATM employs out-of-band signaling which enables it to establish call paths for the voice samples using signaling-only circuits that handle signaling for a large number of calls. The systems of the invention may be modified to support ATM networks and in some embodiments may support out-of-band signaling.

The order in which the steps of the methods are performed is purely illustrative in nature. In fact, the steps can be performed in any order or in parallel, unless-otherwise indicated.

The methods described herein may be performed in hardware, software, or any combination thereof, as those terms are currently known in the art. In particular, the present method may be carried out by software, firmware, or microcode operating on a computer or computers of any type. Additionally, software embodying the invention may comprise computer instructions in any form (e.g., source code, object code, microcode, interpreted code, etc.) stored in any computer-readable medium (e.g., ROM, RAM, flash memory, magnetic media, punched tape or card, compact disc (CD) in any form, DVD, etc.). Furthermore, for purposes of clarity in illustration, the systems and methods described discuss telephony applications. However, the systems and methods described herein are not limited and may be employed in other applications including other uses of data packet technologies, including a range of multimedia services, multimedia conferencing, interactive gaming, video on demand, distance learning and general multimedia applications. Furthermore, such software may also be in the form of a computer data signal embodied in a carrier wave, such as that found within the well-known Web pages transferred among devices connected to the Internet. Accordingly, the present invention is not limited to any particular platform, unless specifically stated otherwise in the present disclosure.

While particular embodiments of the present invention have been shown and described, it will be apparent to those skilled in the art that changes and modifications may be made without departing from this invention in its broader aspect and, therefore, the appended claims are to encompass within their scope all such changes and modifications as fall within the true spirit of this invention.

The invention claimed is:

1. A system for providing in-band control for transmitting data from a local end to a remote end and for remote provisioning of circuits, comprising
a plurality of storage devices at the local end,
a switching system executing:
a process for sorting incoming TDM data into the plurality of storage devices as a function of a destination associated with respective TDM data,
a process for reading data from the storage devices according to a predetermined sequence, whereby data transmitted from the local end is received at the remote end in a sequence representative of data destination, and
a process for monitoring incoming data and creating a connection table at the local end for storing information representative of memory locations at the remote end being provisioned for storing data associated with a respective one of the destinations.

2. A system according to claim 1, further comprising a process for in-band transmission of data representative of the connection table to the remote end for creating a remote connection table.

3. A system according to claim 1, further comprising An initialization process for transmitting a connection table to the remote end to allow transmission of data between the local and the remote end.

4. A system according to claim 1, further comprising an update process for monitoring incoming TDM data and altering the local and remote connection tables in response to detected changes in calls being handled by the system.

5. A system according to claim 4, wherein the update process further includes a remote table update process for generating control cells for in-band communication of connection table data for updating the remote connection table.

6. A system according to claim 1, wherein the remote end and the local end each include connection tables for supporting bidirectional calls.

7. A system according to claim 1, wherein the connection table stores information for supporting 1:1 switching.

8. A system according to claim 1, wherein the connection table stores information for supporting 1:N switching.

9. A system according to claim 1, wherein the connection table stores information for supporting multi-cast or broadcast switching.

10. A system according to claim 3, wherein the initialization process is activated as part of a fail-over sequence.

11. A system according to claim 4, wherein the update process is responsive to a scheduling signal that schedules updates at a rate selected to employ an amount of predefined amount of bandwidth.

12. A process for providing in-band provisioning control for a switch, comprising the steps of processing incoming TDM data to identify a number of circuits to provision for, at a local end, provision memory locations at a remote end that are capable of storing data for respective ones of the identified circuits, generating a table representative of the circuits and provisionable memory locations, and transmitting the table as in-band data packets to the remote end.

13. The process of claim 12, further comprising defining a sequence for transferring data between the local and remote end, and at the remote end, storing data into memory locations as a function of the order in which data occurs in the sequence.

14. The process of claim 12, further comprising at the remote end, building a connection table, and returning an acknowledge signal to the local end.

15. The process of claim 12, further comprising periodically transferring connection table data to the remote end.

16. The process of claim 12, further comprising providing connection tables at the local end and the remote end to support bidirectional calling.

17. The process of claim 12, further comprising transferring connection table data in response to a detected failure at the remote end.

18. The process of claim 12, further comprising determining a rate for updating a remote connection table as a function of available bandwidth.

* * * * *